(12) United States Patent
Digman

(10) Patent No.: US 7,836,673 B2
(45) Date of Patent: Nov. 23, 2010

(54) COTTON HARVESTING MACHINE WITH ON-BOARD MODULE BUILDER AND INTEGRATED MODULE TRANSPORTER HAVING ON-THE-GO UNLOADING CAPABILITY AND METHOD OF OPERATION OF THE SAME

(75) Inventor: Michael J. Digman, Denver, PA (US)

(73) Assignee: CNH America LLC, New Holland, PA (US)

( * ) Notice: Subject to any disclaimer, the term of this patent is extended or adjusted under 35 U.S.C. 154(b) by 167 days.

(21) Appl. No.: 12/337,021

(22) Filed: Dec. 17, 2008

(65) Prior Publication Data

US 2010/0150692 A1     Jun. 17, 2010

(51) Int. Cl.
*A01D 75/04* (2006.01)
*B60P 1/00* (2006.01)
(52) U.S. Cl. .......................... 56/475; 460/119; 414/111
(58) Field of Classification Search ................ 56/473.5, 56/474, 475, 476, 480; 100/88; 460/119; 414/111, 491–493, 501, 513, 517, 789.7, 414/24.5, 24.6, 477, 786, 812
See application file for complete search history.

(56) References Cited

U.S. PATENT DOCUMENTS

| | | | | |
|---|---|---|---|---|
| 4,844,675 | A | * | 7/1989 | Strosser et al. .............. 414/111 |
| 5,511,921 | A | * | 4/1996 | Meijer ....................... 414/24.5 |
| 5,829,238 | A | | 11/1998 | Branson |
| 5,842,823 | A | * | 12/1998 | Kohnen et al. .............. 414/111 |
| 6,053,685 | A | | 4/2000 | Tomchak |
| 6,134,870 | A | | 10/2000 | Lippens et al. |
| 6,240,712 | B1 | | 6/2001 | Meijer |
| 6,421,996 | B1 | | 7/2002 | Deutsch et al. |
| 6,478,523 | B1 | | 11/2002 | Meijer |
| 6,682,417 | B2 | | 1/2004 | Covington et al. |
| 6,851,908 | B2 | | 2/2005 | Bergen et al. |

FOREIGN PATENT DOCUMENTS

| | | |
|---|---|---|
| EP | 0404668 | 12/1990 |
| EP | 0424192 | 4/1991 |
| GB | 2263433 | 7/1993 |

* cited by examiner

*Primary Examiner*—Robert E Pezzuto
(74) *Attorney, Agent, or Firm*—Michael G. Harms; Patrick M. Sheldrake

(57) ABSTRACT

An on-board rectangular cotton module builder and transporter and method of operation of the same, wherein the module builder includes a cotton accumulating cavity for receiving harvested cotton, apparatus for distributing and compacting cotton in a module building chamber having a door through which a cotton module is unloaded from the chamber onto the transporter, and apparatus deployable for holding cotton in the accumulating cavity for conveyance and distribution into the module building chamber away from the door when open. As a result, a cotton module is movable from the module building to the transporter on-the-go while harvesting, and while cotton is conveyed and distributed in the module building chamber. The transporter is operable for carrying the module while continuing harvesting and for unloading the module when desired, including in sequence with a second module from the module builder.

23 Claims, 11 Drawing Sheets

COTTON HARVESTING MACHINE WITH ON-BOARD MODULE BUILDER AND INTEGRATED MODULE TRANSPORTER HAVING ON-THE-GO UNLOADING CAPABILITY AND METHOD OF OPERATION OF THE SAME

TECHNICAL FIELD

This invention relates generally to a cotton harvesting machine having an on-board cotton module builder, and more particularly, to a combination of a module builder and module transporter, operable in cooperation for moving a cotton module from a module building chamber of the module builder to the transporter, including as cotton is conveyed and distributed in the module building chamber, and for unloading a module from the transporter, on-the-go while harvesting.

BACKGROUND ART

Cotton harvesters including on-board cotton module builders have now been in use for some time. Generally, cotton modules have traditionally had a rectangular shape, conforming to specific dimensions to facilitate handling and transporting on dedicated vehicles, and processing by gins. The most accepted and recognized of the known on-board module builders utilize an accompanying unloading door or ramp, which unfolds as the module builder is tilted, for providing a continuous, level surface extending from the floor of the builder to the ground or other surface onto which the module is to be unloaded. The ramp has a length which is selected so as to be at a sufficiently small angle to the ground or other surface such that the cohesion and integrity of the module are maintained, during the transition of the module from the ramp onto the surface. A shortcoming, though, of tilting the module builder for unloading is that the harvesting and module building process are interrupted during the unloading.

An important factor in cotton harvesting is productivity, and, as a result, it would be desirable to many owners and operators, to have capabilities to both remove a completed cotton module from a module building chamber of the module builder, and to unload a completed module onto the ground or another surface, without interrupting the harvesting operation, that is, on-the-go while harvesting. For instance, in regard to the former, often a module will be completed in the middle of a crop row, far from the end of the row or other location where it is desired to unload the module. It would decrease productivity to have to interrupt the harvesting operation in the middle of a row, drive to the end of the row or other location, unload, then return to the middle of the row to continue harvesting. As a result, it is sometimes desirable to have the capability to carry a completed module on the module builder, while a second module is being built, then to unload the modules in succession at the same or different locations. Unloading successively at a single location is a particularly desirable capability when the modules are of the rectangular type, two of which can typically be carried by a module transporter to a gin or other destination.

Reference Deutsch, U.S. Pat. No. 6,421,996, issued Jul. 23, 2002 to Deere & Co., entitled Harvester with Bale Forming Chamber Having a Transport Mode, which discloses apparatus providing a capability for forming a round cotton bale in an on-board chamber in the manner of forming a hay or straw bale, and opening the chamber to roll the bale onto a lower platform. The bale can be carried on the platform, and, when desired, the platform tilted for rolling the bale onto the ground or another surface. This provides a desired sequence of operation, but the apparatus is not adaptable for use with rectangular modules, as the rectangular modules are substantially larger, do not roll, and the integrity of the modules would likely be compromised by a similar platform construction. Additionally, as a result of the manner of opening the on-board bale forming chamber, cotton cannot be conveyed thereto as a bale is moved to lower platform, and thus this cotton must be accumulated elsewhere until the bale forming chamber is closed again.

Accordingly, what is sought is a cotton harvesting machine and method of operation, utilizing a combination of a module builder and module transporter, which overcomes one or more of the shortcomings set forth above, and which is operable for moving a module, particularly a rectangular module, from the module builder to the transporter, while cotton is continued to be conveyed and distributed in the module building chamber; carrying the module on the transporter; and unloading the module from the transporter onto the ground or another surface, all on-the-go while harvesting.

SUMMARY OF THE INVENTION

What is disclosed is a cotton harvesting machine having a combination of a module builder and module transporter and a method of operation of the same, which overcomes one or more of the shortcomings set forth above, and which is operable for moving a module from the module builder to the transporter, including while cotton is conveyed and distributed in the module building chamber; carrying the module on the transporter; and unloading the module from the transporter onto the ground or another surface, all on-the-go while harvesting, and which is adapted for use with rectangular modules.

According to a preferred aspect of the invention, the on-board cotton module builder includes a cotton accumulating cavity for receiving at least one airborne stream of harvested cotton from harvesting units of the machine. The module builder includes apparatus for conveying and distributing the cotton from the accumulating cavity into a module building chamber, and for compacting the cotton received in the module building chamber. The module building chamber has a generally rectangular shape, which will be imparted to the cotton module made therein, and the module builder includes a door in connection with the module building chamber through which a cotton module can be moved from the chamber onto the transporter. The module builder has a substantially flat floor, and the transporter essentially forms an extension of the floor, such that the integrity and cohesion of a cotton module moved from the module building chamber to the transporter is maintained. Suitable cotton drivers can be provided on the floor, and, if required, on the transporter, for effecting movement of a cotton module in a desired manner therealong, e.g., from the module building chamber onto the transporter, and optionally, from the transporter when in a tilted orientation onto the ground or another surface therebelow. A nonlimiting example of suitable drivers are conventionally constructed and operable drag chains.

According to another preferred aspect of the invention, the apparatus for conveying and distributing the cotton from the accumulating cavity comprises at least one auger supported on a frame, disposed in a generally horizontal orientation in an upper region of the module building chamber. When building a module in the module building chamber, the auger or augers are preferably operated to convey and distribute the cotton about equally along the extent thereof between the opposite ends, and the apparatus can be lowered against the cotton in the chamber to compact it into a cohesive, integrated cotton module, capable of conforming to and retaining the generally rectangular shape of the module building chamber when the module is freestanding on the transporter, and after unloading from the transporter onto the ground or another surface.

The opening through which a cotton module can be removed from the module building chamber is preferably located in one end thereof, preferably the rear end, and the auger or augers are preferably controllable for conveying and distributing the cotton into at least one end portion of the chamber, which for the preferred module builder construction is the forward end portion opposite or away from the rearwardly located opening. According to a method of the invention, as a module is moved through the opening, the auger or augers are preferably operated to convey and distribute cotton into the portion of the chamber vacated by the module, the size of which portion of the chamber will increase as the module exits the chamber. Thus, the end of a cotton module being moved from the chamber can serve as a barrier to prevent loss of loose cotton from the chamber. This provides a large cotton receiving capacity during movement of a cotton module from the builder to the transporter, which has particular advantage for harvesting machines having a large cotton harvesting capacity, such as those of the commercially available 5 and 6 row varieties. Given a high rate of cotton inflow, as the end of the module leaves the chamber, the conveying and distributing operation can be briefly interrupted, until the door is closed to prevent cotton loss from the chamber through the opening.

As another preferred aspect of the invention, the door will be of a suitable construction and operation so as to be rapidly closable to prevent cotton loss from the module building chamber after passage of a module from the chamber to the transporter. The door will also be sufficiently compactable so as to be openable and closable without interfering with a cotton module located on the transporter, and/or within the module building chamber. The door should also be sufficiently robust to withstand compaction of cotton thereagainst during the module building process, without significant deformation or degradation of operation. As a nonlimiting preferred example, the door can comprise a roll up type door storable in an open position in a drum disposed above the opening, and is movable between its open and closed modes, using a suitable driver, such as a fluid or electric motor. The door will also preferably have a smooth inner surface facing the module building chamber so as to be movable upwardly and downwardly while in contact with the end of a module located within the chamber.

According to another preferred aspect of the invention, the module transporter is mounted on the harvesting machine rearwardly of and adjacent to the rear opening. The transporter is preferably a multiple section structure configured so as to be foldably compactable in a stored position adjacent to the door of the module builder, and unfoldable into a generally horizontal deployed position extending rearwardly and outwardly from the rear opening in substantially coplanar relation to the floor. The transporter is sufficiently robust for supporting a cotton module thereon, and is further pivotable, while supporting a module, from the generally horizontal deployed position to a tilted unloading position extending downwardly from the module builder to a surface disposed therebelow, to enable unloading the module onto the surface. Suitable drivers such as fluid cylinders, are operable for folding the transporter, as well as tilting it between the deployed position and the unloading position.

According to still another preferred aspect of the invention, the transporter includes a wheel assembly configurable in a transport mode for supporting the transporter in the horizontal deployed position with a cotton module thereon for travel over a field as the machine harvests cotton therefrom, and in an unload mode supporting the transporter in the tilted unloading position for moving a cotton module thereon downwardly for unloading onto the ground or another surface as the machine moves along the surface. The wheel assembly also preferably includes pivoting or caster wheels, for accommodating turning in headlands and the like. The wheel assembly can be telescopically or otherwise movable, e.g., pivotable, between the transport mode and the unload mode.

In operation, as an advantage of the invention, a module completed while harvesting can be moved from the module builder to the transporter, without interrupting harvesting or the module building process. As another advantage, a rectangular module can be carried on the transporter and unloaded when desired, such as at the periphery of field when reached during the normal course of harvesting, such that no special trip to the unloading location is required. Unloading involves tilting the transporter only, such that the module building process does not have to be interrupted, as would be necessary if it were required to tilt the module builder for unloading. Additionally, at this time, a completed module in the module builder can also be unloaded, so as to be positioned in abutment with the module from the transporter, if desired, for facilitating pick up using a conventional module transporter trailer or truck. Optionally, the module builder can be configured for tilting for unloading, as desired.

DETAILED DESCRIPTION OF THE INVENTION

Figure 1:
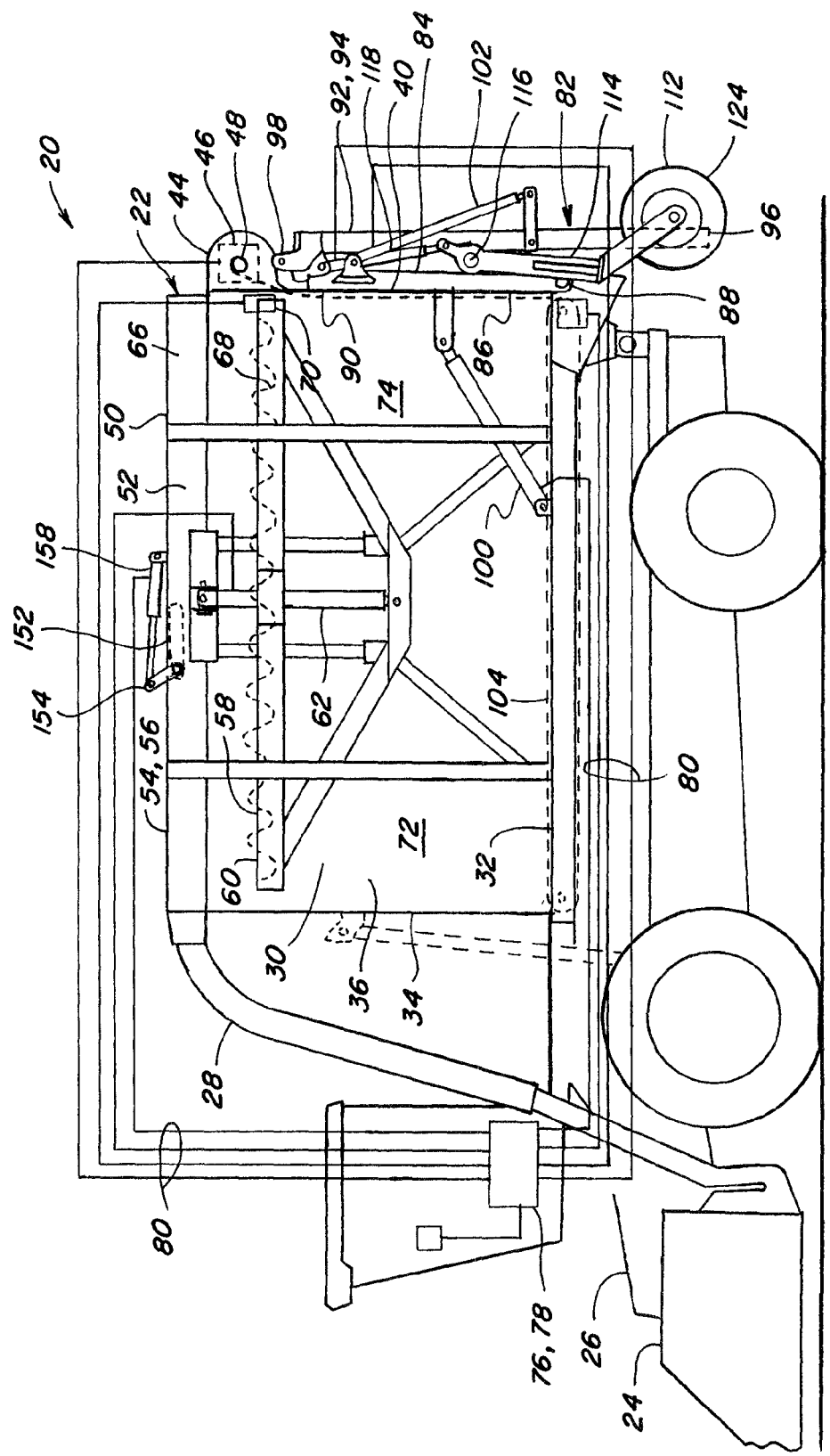
FIG. 1 is a simplified side view of a cotton harvesting machine, including a cotton module builder, and an associated module transporter in a folded stored position and including a first embodiment of a wheel assembly therefor, according to the invention.
Figure 2:
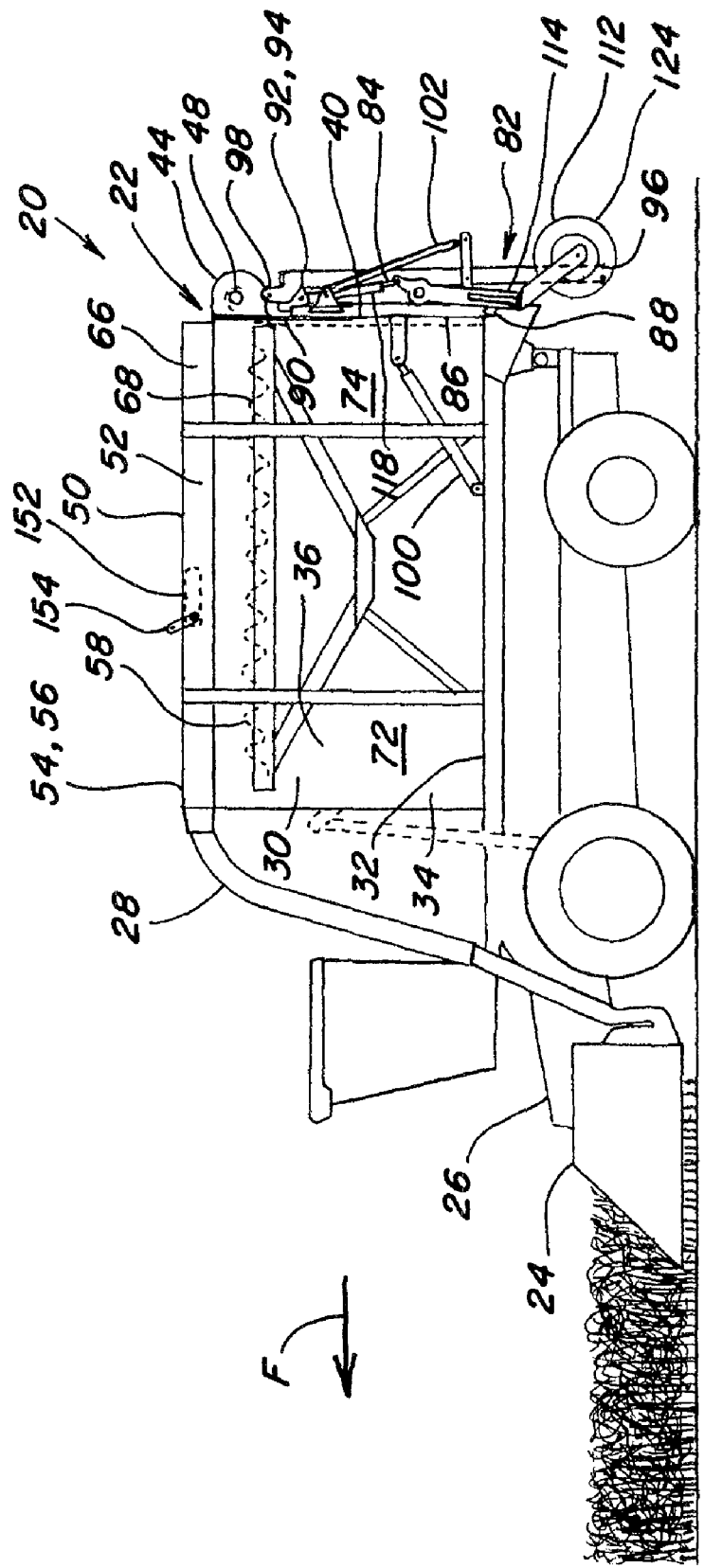
FIG. 2 is another simplified side view of the harvesting machine, shown harvesting cotton crops from a field with the transporter in the stored position.

Referring now to the drawings, in FIGS. 1 and 2, a representative self-propelled mobile cotton harvesting machine 20 is shown. Harvesting machine 20 generally includes an engine and drive train (not shown) for propelling it, and for powering the various systems thereof, including a cotton compacting system including a module builder 22 for building a cotton module from cotton as it is harvested by machine 20. Cotton harvesting machine 20 includes and powers a plurality of cotton harvesting row units 24 mounted transversely across a forward end 26 of machine 20 in the conventional manner, for removing cotton from cotton plants of a cotton field as machine 20 is driven in a forward direction, denoted by arrow F, over the field. After the cotton is removed from the cotton plants by row units 24, the cotton is conveyed through a cotton conveyor structure 28 from the row units 24 to module builder 22. Module builder 22 includes and defines a generally rectangular module building chamber 30 enclosed at its bottom by a floor 32, at its forward end by a forward wall 34, and on its sides by side walls 36, walls 34 and 36 extending upwardly from floor 32.

Figure 3:
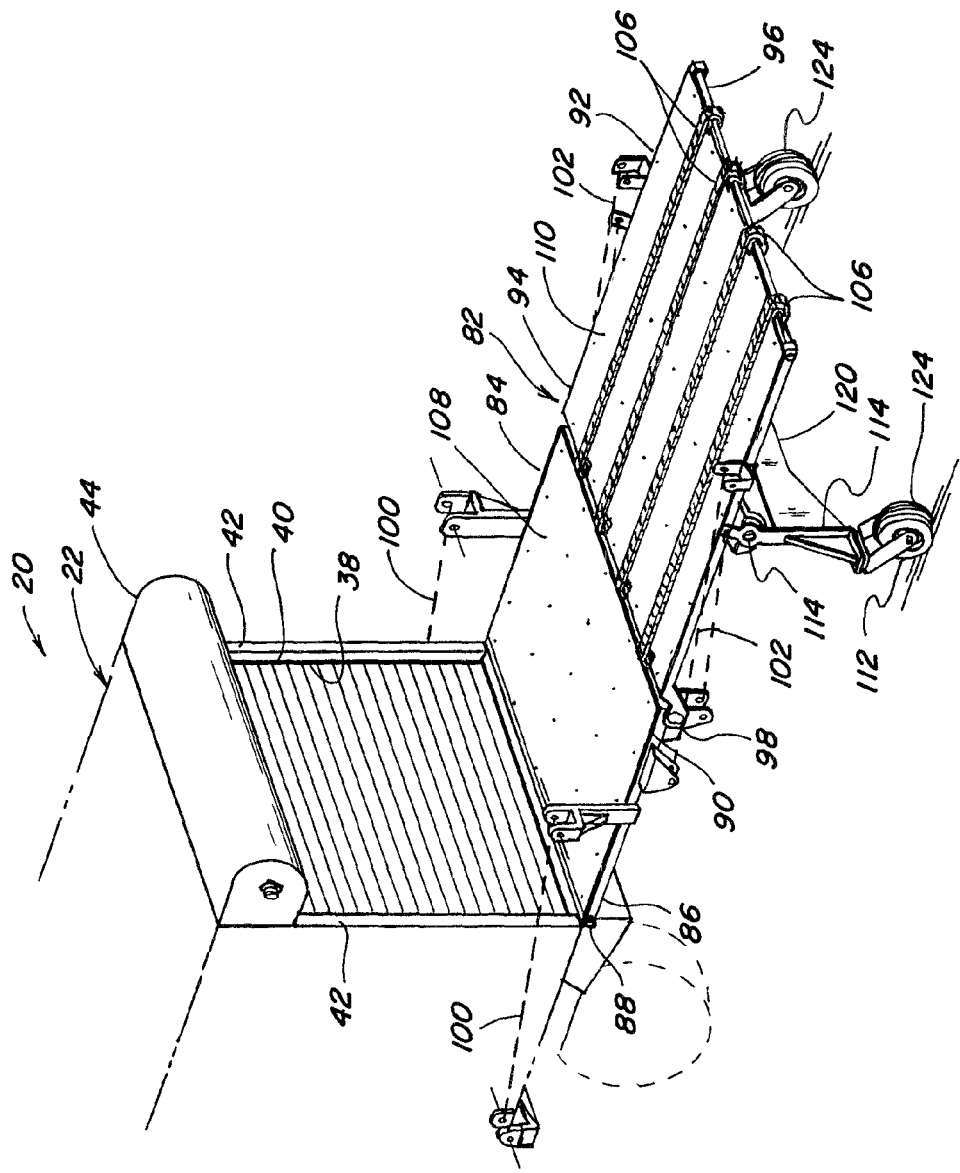
FIG. 3 is a fragmentary perspective view of the harvesting machine, showing the rear end of the module builder and the transporter in an unfolded deployed position.

Referring also to FIG. 3, a rear end of module builder 22 includes a rear opening 38 which is normally enclosed by a door 40. Opening 38 is sufficiently large for the passage of a cotton module formed in chamber 30. Door 40 is preferably a roll up type door which is movable upwardly and downwardly guided by the location of side edges of the door within channels or tracks 42 located beside opening 38. Door 40 is configured to be rolled up in an open configuration, within a drum 44 located atop opening 38. A suitable driver 46, which can be, for instance, an electric or fluid motor, is operable for rotating a shaft 48 extending sidewardly through drum 44, in a first direction, for rolling door 40 about shaft 48 to close door 40, and to rotate shaft 48 in an opposite direction for unrolling and opening the door.

The upper region of module building chamber 30 of module builder 22 is enclosed by a roof structure 50 which defines and encloses a cotton accumulating cavity 52. Cotton accumulating cavity 52 has a forward end portion 54 adjacent to at least one forwardly facing inlet opening 56, configured in communication with the ends of cotton conveying structure 28, for receiving airborne streams of the harvested cotton therefrom, in the well-known manner. Module builder 22 also includes a cotton compacting apparatus 58 disposed in an upper region of module building chamber 30, for movement downwardly against cotton contained in chamber 30 for compacting the cotton against floor 32. Compacting apparatus 58 is of well known construction and includes a generally horizontal frame 60 supported for the upward and downward movement by a pair of drivers 62 located outside of side walls 36. Drivers 62 can comprise, for instance, fluid cylinders having upper ends connected to the module builder and lower ends connected to frame 60 externally of the module building chamber, and extendable for moving frame 60 downwardly, and retractable for moving the frame upwardly, as is well known.

Generally, a cotton module built using module builder 22 will have a generally rectangular or four sided shape when viewed from above which will have a longitudinal extend of about 14 to 18 feet, a transverse extent of from about 6 to 9 feet, and a height of up to about 9 feet. The shape when viewed from above and the longitudinal and transverse dimensions of the module are determined by the corresponding dimensions of cotton compacting chamber 30. Representative cotton modules 64 are shown in FIGS. 11-15.

As noted above, on-the-go during the harvesting operation, cotton is conveyed by air flows through cotton conveyor structure 28 into cotton accumulating cavity 52, above compacting apparatus 58. The cotton must then pass or be conveyed downwardly through compacting apparatus 58 into module building chamber 30. Additionally, initially the cotton may not be evenly distributed either forwardly and rearwardly or side to side within cavity 52, and the amount and density of the cotton within cavity 52 can vary widely, depending on such factors as harvesting rate and the amount of cotton conveyed to the module building chamber 30 and compacting actions done by compacting apparatus 58 within chamber 30. In the former regard, with the advent of six row cotton harvesters, the rate of cotton inflow into cavity 52, particularly under high yield conditions, can be quite high, sufficient for cotton to collect to a significant level.

As a result, compacting apparatus 58 preferably includes at least one conveyor which is preferably an auger 68, supported on frame 60 and controllably operable in the well-known manner, for conveying and distributing cotton into and within module building chamber 30. One or more auger drivers 70, which can be, for instance, a fluid or electric motor or motors, is/are supported on frame 60 for rotating auger or augers 68, in one direction for conveying and distributing cotton into and within chamber 30 more forwardly, that is, more toward a forward portion 72 adjacent forward wall 34, and in an opposite direction for conveying and distributing the cotton more rearwardly, into a rear portion 74 adjacent door 40. An example of a possible auger arrangement that can be used is two parallel forwardly and rearwardly extending helical auger, which are simultaneously rotated in the same direction. Another example uses three augers, all of which can be rotated in the same direction, or a middle one of which can be counter-rotated.

Preferably, drivers 62 operable for compacting the cotton in chamber 30, and driver or drivers 70 operable for conveying and distributing the cotton into and within chamber 30, will be automatically controlled by a module builder control system 76, including a programmable processor operated controller 78, connected in operative control of drivers 62 and 70 in any suitable manner, as illustrated by lines 80, which can represent, for instance, fluid lines, or wires of a wiring harness, a controller area network, a wireless control system, or the like, extending between controller 78 and devices controlling the drivers such as solenoid controlled valves or the like. Briefly, if fluid controlled, each driver will receive pressurized fluid from a pressurized fluid source such as a pump (not shown) on machine 20, through one port to effect operation thereof in one direction, and through another port to effect operation in the opposite direction. This fluid delivery will typically be controlled by the solenoid controlled valves or other devices, which, in turn, are operated by electrical signals outputted by controller 78, and can be predetermined, e.g., timed, and/or a function of input signals, e.g., feedback of fluid pressure, and/or position, orientation, tilt, etc. of frame 60.

As an example of a representative automatic module building routine that could be used, driver or drivers 70 may be operated in one direction and then the other to convey and generally evenly distribute cotton within chamber 30, interposed with periodic compaction steps effected by operation of drivers 62 to forceably lower frame 60 against the distributed cotton in chamber 30. As the level of the compacted cotton in the chamber increases, e.g., the module is increasing in height as it is being built, the lowered position of the frame is adjusted or indexed upwardly. The augers will typically not be rotated during this compaction steps. The augers will be rotated during the cotton conveying and distributing steps to distribute cotton into the module building chamber, onto the partially built module. When a module is complete, compacting apparatus 58 will be retracted upwardly to a position spaced thereabove, to allow removal of the module from the chamber.

Figure 4:
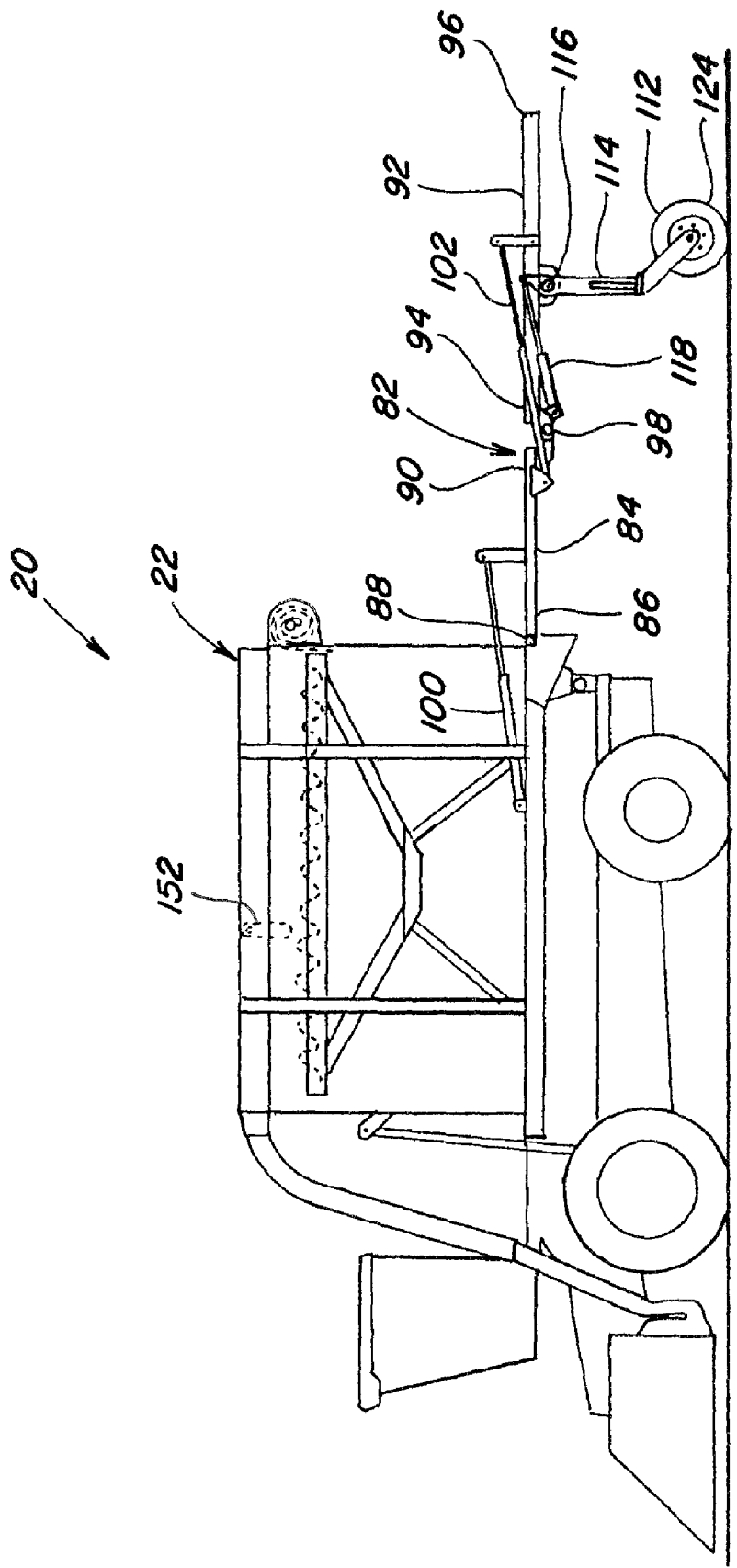
FIG. 4 is another simplified side view of the harvesting machine, showing the transporter in the deployed position.
Figure 5:
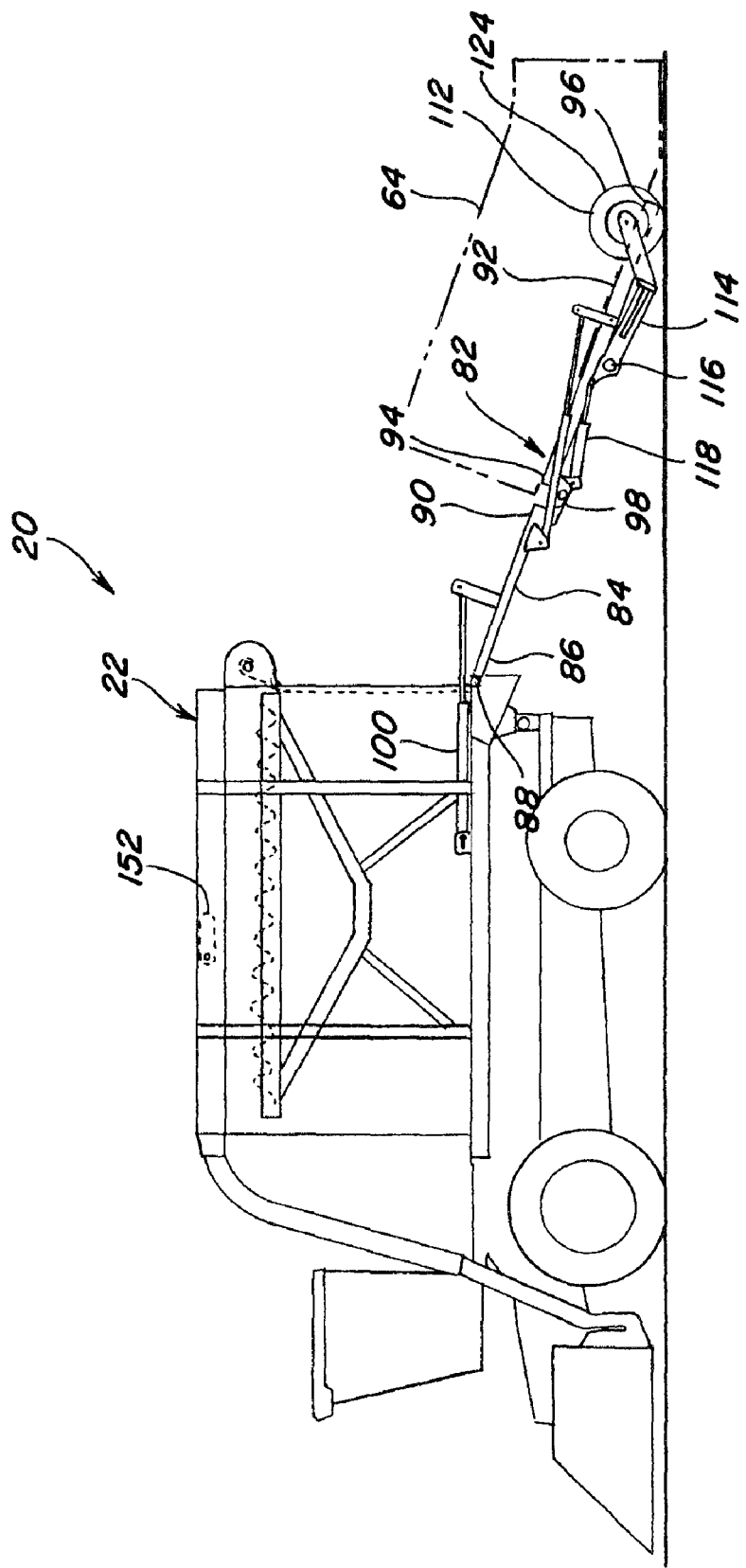
FIG. 5 is still another simplified side view of the harvesting machine, showing in the transporter tilted to an unloading position.

Referring also to FIGS. 4 and 5, harvesting machine 20 further includes a module transporter 82 disposed adjacent to rear opening 38. Module transporter 82 is configured and operable for receiving and supporting a module 64 from module builder 22, including as machine 20 continues to harvest and deliver cotton to module builder 22. Transporter 82 preferably comprises a multiple segment platform which is controllably operable for movement between a folded or stored position or configuration (FIGS. 1 and 2) rearward of door 40, and an unfolded or deployed position or configuration (FIGS. 3, 4 and 5). Additionally, in the deployed configuration transporter 82 is pivotably movable between a transport position at least generally coplanar with floor 32 of module builder 22 (FIGS. 3 and 4) so as to essentially form a continuation thereof extending outwardly of the module builder for receiving and carrying a cotton module therefrom, and a tilted unloading position (FIG. 5) from which a module can be unloaded onto the ground or another surface therebelow.

A preferred embodiment of transporter 82 is a multiple segment construction, including a first segment 84 which is a rigid, generally planar platform structure having a first end 86 pivotally mounted to machine 20 or module builder 22 adjacent to rear opening 38 by a pivot 88, and a second end 90 opposite first end 86. First segment 84 is pivotally movable relative to module builder 22 through a range including the folded or closed position (FIGS. 1 and 2) in at least partially covering relation to rear opening 38; the unfolded or deployed position (FIGS. 3 and 4) extending at least substantially coplanar to floor 22; and the tilted position (FIG. 5). Transporter 82 includes a second segment 92 which is also a rigid, generally planar structure having a first end 94 pivotally mounted to second end 90 of segment 84 at an intermediate location between module builder 22 and a free end 96 of second segment 92, by a pivot 98. Second segment 92 is pivotally movable between a folded or closed position in generally side-by-side or overlaying relation to first segment 84 (FIGS. 1 and 2), and an unfolded position aligned so as to be at least substantially coplanar with and in end-to-end relation to first segment 84 (FIGS. 3, 4 and 5).

A pair of primary transporter drivers 100, which preferably comprise fluid cylinders, are pivotally connected between module builder 22 and first segment 84, and are operable for pivotally moving segment 84 between the closed or folded position and the open or unfolded position. Transporter 82 includes a pair of secondary transporter drivers 102, which are also preferably fluid cylinders, connected between first segment 84 and second segment 92 and operable for pivotally moving second segment 92 between its folded position and its unfolded position. Drivers 100 and 102 are preferably controlled in a coordinated manner by control system 76, via such control devices as solenoid operated valves or the like, operable for controlling delivery of pressurized fluid to drivers 100 and 102, as illustrated by lines 80 extending between controller 78 and drivers 100 and 102.

In the present instance, a completed cotton module such as module 64 will have a length of about 16 feet, and can weigh about 11,000 pounds. When unfolded and deployed, transporter 82 will have a sufficient length and load bearing capacity for carrying a module thereon, which length is thus at least about 16 feet and preferably about 19 feet or so, which length is also long enough to extend from floor 32 to the ground or another surface therebelow, while tilted at an angle to the lower surface which is sufficiently small such that a cotton module can be moved from the transporter onto the lower surface without significantly tearing, fracturing or otherwise damaging the integrity of the module. Preferably, this angle will be less that about 25 degrees or so, and more preferably less than about 20 degrees.

To effect forward to rearward movement of a cotton module such as a module 64 from module building chamber 30 through opening 38 and onto transporter 82, floor 32 includes at least one cotton driver 104 (FIG. 1) which preferably is a conventional drag chain operable in a forward to rearward direction for dragging or urging a cotton module within chamber 30 rearwardly, and operable in the opposite direction for moving or urging the module forwardly. Similarly, at least second segment 92 of transporter 82 includes at least one cotton driver 106 (FIG. 3), also preferably comprising a forwardly and rearwardly operable drag chain. Cotton drivers 104 on floor 30 and drivers 106 on segment 92, respectively, are preferably independently operable and include a conventional hydraulic motor, electric motor, or by connection to an engine of machine 20 or other motive source, as controlled by suitable control devices, e.g., solenoid controlled valves, connected to controller 78 of control system 76, as illustrated by lines 80.

Additionally, as required to facilitate movement of a module from module builder 20 to transporter 82, floor 32, an upwardly facing surface 108 on first segment 84, and an upwardly facing surface 110 on second segment 92, (see FIG. 3) can comprise low friction polymer sheets or coatings. The construction and operation of a typical module builder, compacting apparatus and cotton drivers, and the location and composition of the low friction polymer sheets, are variously explained in greater detail in relation to an analogous unloading door arrangement, in Covington et al., U.S. Pat. No. 6,766,634, issued Jul. 27, 2004, and U.S. Pat. No. 7,322,460, issued Jan. 29, 2008, which are hereby incorporated herein by reference in their entireties. Here though, because at times transporter 82 will be used for carrying a module 64, possibly over rough terrain, furrows and the like, if a low friction polymer is used on surfaces 108 and 110, cotton drivers 106 may be configured for cooperatively engaging the bottom of a module 64 supported on transporter 82, to retain and hold the module thereon during such movements.

Additionally, to provide structural integrity and support for transporter 82 when carrying a cotton module, transporter 82 preferably includes a wheel assembly configured and operable for supporting transporter 82 in the deployed position generally coplanar with floor 32, with a module 64 thereon, for movement along the ground or another surface therebelow; and for supporting transporter 82 in the tilted position, also with a module 64 thereon, and for unloading module 64 from the tilted transporter. To achieve this dual purpose functional capability, the wheel assembly is preferably automatically configurable in two modes, including a transport mode for supporting transporter 82 in the deployed transport position coplanar with the floor; an unload mode for supporting the transporter in the tilted position; and for transitioning between the two modes, with or without a module located on the transporter, and while moving over rough surfaces, including when harvesting. Additionally, at least when in the transport mode, the wheel assembly should allow or facilitate turning movements of harvesting machine 20 with a module supported on transporter 82, such as 180 degree turns commonly executed in the headlands of a field when turning between harvesting swaths.

According to one preferred embodiment, a wheel assembly 112 is shown in FIGS. 1-5 and 15, which is a pivoting assembly pivotably movable between the transport and unload modes. Wheel assembly 112 includes legs 114 mounted on opposite sides of transporter 82 by pivot joints 116. Drivers 118, each preferably comprising a fluid cylinder, are connected between each leg 114 and transporter 82, and are jointly operable for pivotally moving legs 114 between transport and unload mode positions. In the transport mode position (FIGS. 3 and 4), legs 114 will preferably be about perpendicular to transporter 82, and in the unload mode position, the legs will preferably be oriented at a small acute angle or about parallel to the transporter. Legs 114 are also preferably connected together beneath transporter 82, by a rigid brace structure 120 (FIG. 3). Each leg 114 includes a wheel 122, which is preferably a connected to the leg by a pivot joint, to offset an axis of rotation of the wheel in relation to the leg, to provide a castering capability to allow better following of turning movements of machine 20.

Figure 6:
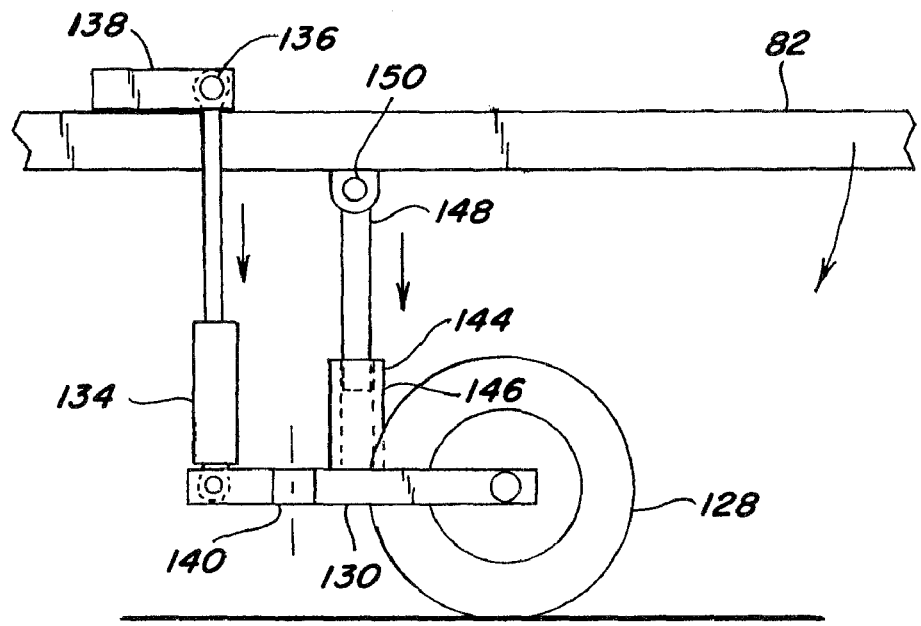
FIG. 6 is a fragmentary side view of the transporter, showing an alternative embodiment of a wheel assembly, shown configured in a transport mode for supporting the transporter in the deployed position.
Figure 7:
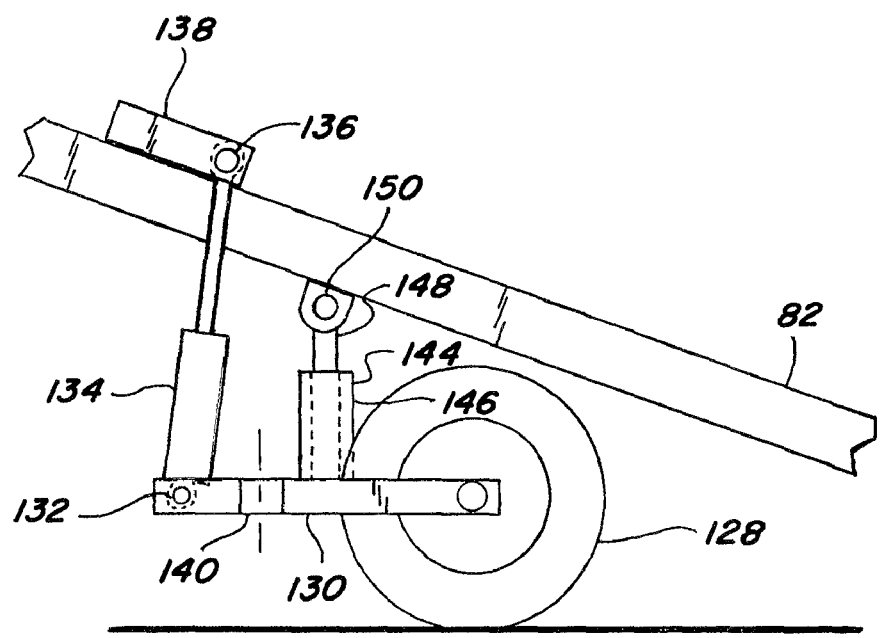
FIG. 7 is another fragmentary side view of the transporter, shown tilted with the alternative wheel assembly configured in an unload mode.
Figure 8:
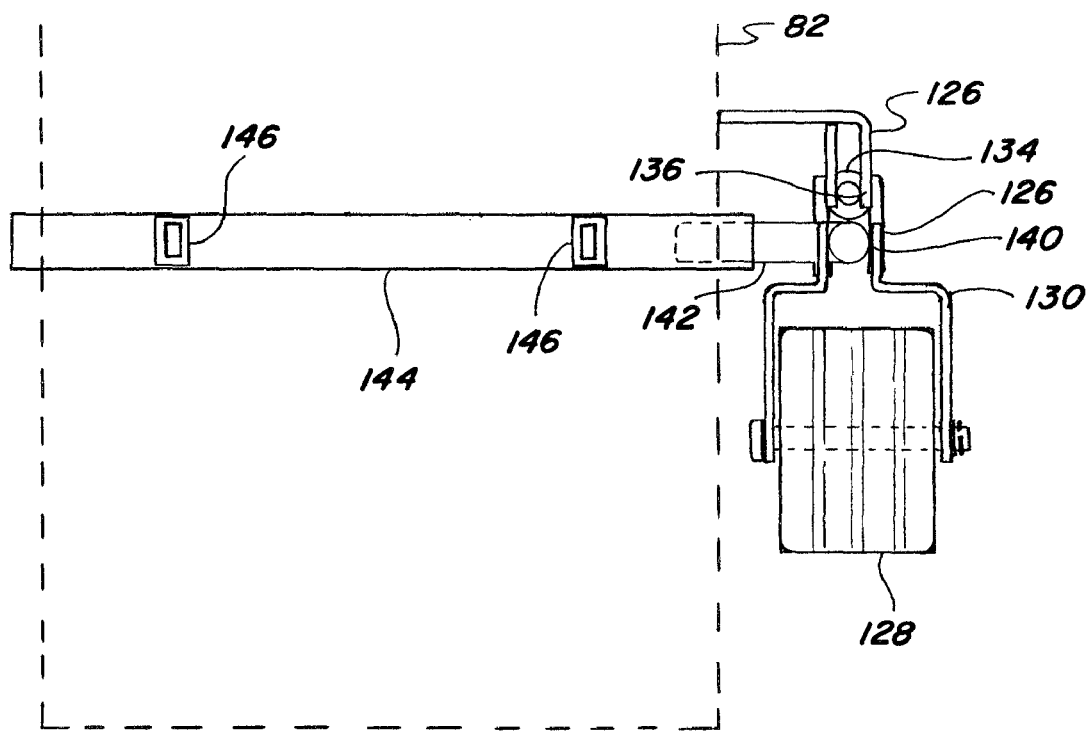
FIG. 8 is a simplified top view of the alternative wheel assembly, illustrating the transporter in dotted lines.
Figure 9:
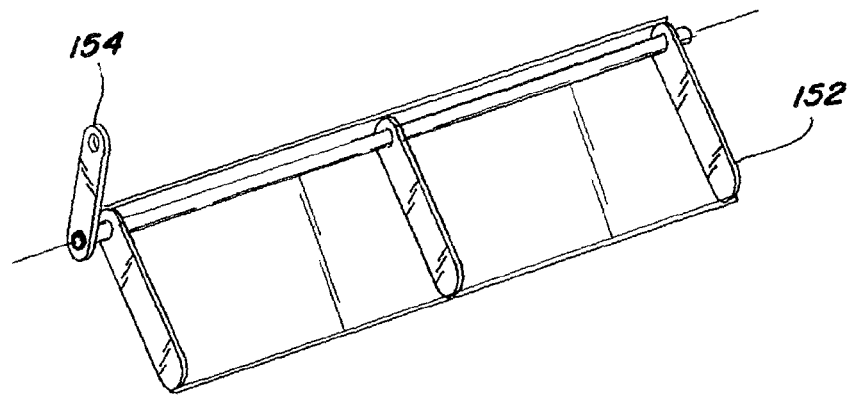
FIG. 9 is a perspective view of one embodiment of a panel deployable in a cotton accumulating cavity of the module builder.
Figure 10:
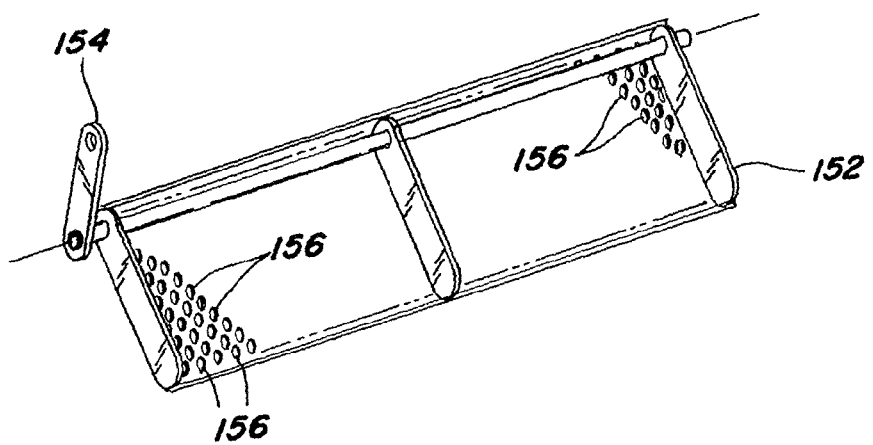
FIG. 10 is a perspective view of another embodiment of a panel for the accumulating cavity of the module builder.

Referring also to FIGS. 6, 7 and 8, transporter 82 is shown including an alternative wheel assembly 126, which is a telescoping assembly. Wheel assembly 126 includes two wheels 128, located adjacent to the sides of transporter 82, respectively. Each wheel 128 is connected to a pivoting support assembly 130, having a front end pivotally connected by a pivot joint 132 to a lower end of a driver 134, for relative vertical pivotal movement. Each driver 134 is preferably a fluid cylinder, and, in turn, has an upper end pivotally connected by a pivot joint 136 to a bracket 138 mounted to the side of transporter 82, for relative vertical pivotal movement. The rear end of each support assembly 130 is connected to the front end by a pivot joint 140, for allowing sideward pivotal or castering movements of the rear end. Each pivot joint 140 also pivotally connects the support assembly 130 to an outer end of a sidewardly extending telescoping axle end 142 (FIG. 8) of a telescoping center axle assembly 144 extending beneath and supporting transporter 82, to allow independent pivoting or castering of wheels 128. Telescoping center axle assembly 144 additionally includes a pair of upwardly extending lower leg portions 146 which telescopically engage downwardly extending upper leg portions 148 connected to transporter 82 by pivot joints 150, to allow relative upward and downward movement of transporter 82 and wheel assembly 126.

Drivers 134 of wheel assembly 126 will preferably be simultaneously extended as shown in FIG. 6, for telescopically extending leg portions 146 and 148, to configure wheel assemblies 126 in a transport mode for supporting transporter 82 in the deployed transport configuration in generally coplanar relation to floor 32, and will be simultaneously retracted (FIG. 7), for telescopically retracting leg portions 146 and 148 to configure the wheel assemblies in an unload mode, for supporting the transporter in the deployed configuration but tilted in the unloading position.

Drivers 118 of wheel assemblies 112, and drivers 134 of wheel assemblies 126, are contemplated to be representative of a wide variety of wheel assemblies that can be used with transporter 82, including other pivoting and telescoping constructions, and therefore are not to be considered as limiting. Drivers 118 and 134 are preferably controllable by suitable control devices, e.g., solenoid valves, operable by control system 76, as represented by connection of driver 118 to controller 78 via line 80 in FIG. 1, so as to be operable simultaneously with primary transporter drivers 100, for moving transporter 82 while deployed, and with a cotton module thereon if present, between the horizontal and tilted positions. This can be done with machine 20 stationary, or moving over a field, including on-the-go while harvesting cotton, or over another surface. The drivers can also be operated for positioning wheel assemblies 112 and 126 in a desired or required position, e.g., unload position, when transporter 82 is folded or stored against module builder 22, as shown by wheel assembly 112 in FIG. 1.

As noted above, it may be desirable in some instances to move a module 64 from module builder 22 to transporter 82, while continuing to harvest cotton, and delivering the cotton to the module builder. The rate of cotton delivery to module builder 22 may be quite substantial, particularly when yield is high, and/or when the harvesting machine is a large machine, e.g., having 5 or 6 row units 24. As a result, during the time it takes to move a module from module builder 22 to transporter 82, which can be less than two minutes or so, the volume of the incoming cotton can be substantial. To limit cotton loss while a module is moved therefrom onto transporter 82, including while the module is partially in chamber 30 and partially on transporter 82, according to the invention, the distribution of the cotton into the module building chamber can be limited to forward portion 72 of the chamber while door 40 is open.

Referring also to FIGS. 8, 9, 10, 11, 12, 13 and 14, to limit the distribution so as to be more into forward portion 72 of the module building chamber, and thus to allow opening door 40 while this is occurring, the present invention preferably utilizes a panel 152 disposed in cotton accumulating cavity 52, intermediate forward end portion 54 and rear end portion 66. Panel 152 preferably has sideward and vertical extents just marginally smaller than those of cavity 52, and is supported in cavity 52 by apparatus 154 operable for moving panel 152 between a stored position such as against an upper surface of roof structure 50 enclosing cavity 52 (FIGS. 1, 2, 5, 11 and 14) for allowing substantially free movement of cotton toward rear end 66 of cavity 52, and a deployed position extending between cotton compacting apparatus 58 and the upper surface of roof structure 50 (FIGS. 4, 12 and 13) for containing the cotton which enters cavity 52 within forward end portion 54 and preventing the entering cotton from reaching rear end portion 66. Panel 152 can be formed of a suitable material such as a sheet metal or plastic, of solid construction (FIG. 9) so as to also limit air flow to rear end portion 66, or it can be perforated as illustrated by holes 156 therethrough (FIG. 10), to allow air but not cotton to flow therethrough.

Apparatus 154 is preferably constructed and operable for pivoting panel 152 between its stored and deployed positions, and can comprise a suitable driver 158 (FIG. 1) for this purpose, which can be for instance, a fluid cylinder, connected to panel 152 by a suitable linkage. Driver 158 here is extendable for holding panel 152 in the stored position, and retractable for holding it in the deployed position, and is preferably controllable by controller 78 of control system 76, via suitable control devices, e.g., a solenoid controlled valve, as illustrated by connection thereto by a line 80. Other examples of a suitable driver for this application can include, but are not limited to, a rotary or linear actuator, a fluid or electric motor, or the like.

Figure 11:
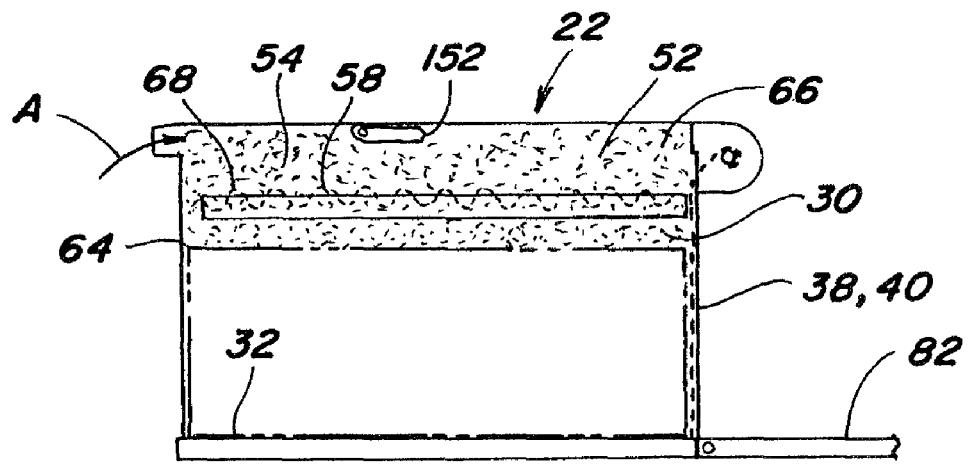
FIG. 11 is a simplified schematic side view of the module builder, illustrating a panel thereof in a stored position allowing incoming cotton to flow throughout an accumulating cavity of the module builder.

Referring more particularly to FIGS. 11, 12 13 and 14, steps of operation of module builder 22 for moving a module 64 from module building chamber 30 onto transporter 82, on-the-go while continuing to harvest cotton, are illustrated. In FIG. 11, cotton from the ongoing harvesting operation enters accumulating cavity 52, as illustrated by arrow A. Panel 152 is in the stored position, such that the cotton is allowed into both forward end portion 54 and rear end portion 66 of cavity 52. Door 40 is closed, covering rear opening 38. Operation of augers 68 of cotton compacting apparatus 58 is ceased, and apparatus 58 is raised above a completed module 64 located in module building chamber 30. Transporter 82 is in the deployed position.

Figure 12:
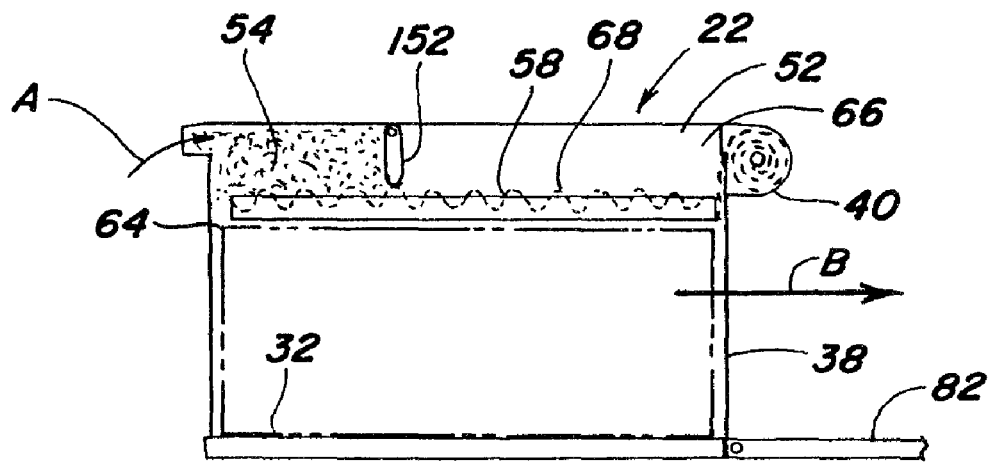
FIG. 12 is another simplified schematic side view of the module builder, illustrating the panel in a deployed position for preventing cotton from flowing to a rear end of the accumulating cavity.

Referring to FIG. 12, while the harvesting continues, panel 152 is moved to the deployed position. Door 40 is opened. This happens rapidly, as door 40 is a fast operating roll up door. Harvested cotton from the harvesting operation continues to enter cavity 52, as denoted by arrow A, but will be briefly contained in the forward end portions 54 and 72. Movement of module 64 through opening 38 onto transporter 82 is commenced by actuation of cotton drivers 104 (FIG. 1) on floor 32, as denoted by arrow B. Compactor 58 remains raised and augers 68 are off. These steps can all be performed automatically as part of a module transferring or unloading routine, by controller 78 of system 76.

Figure 13:
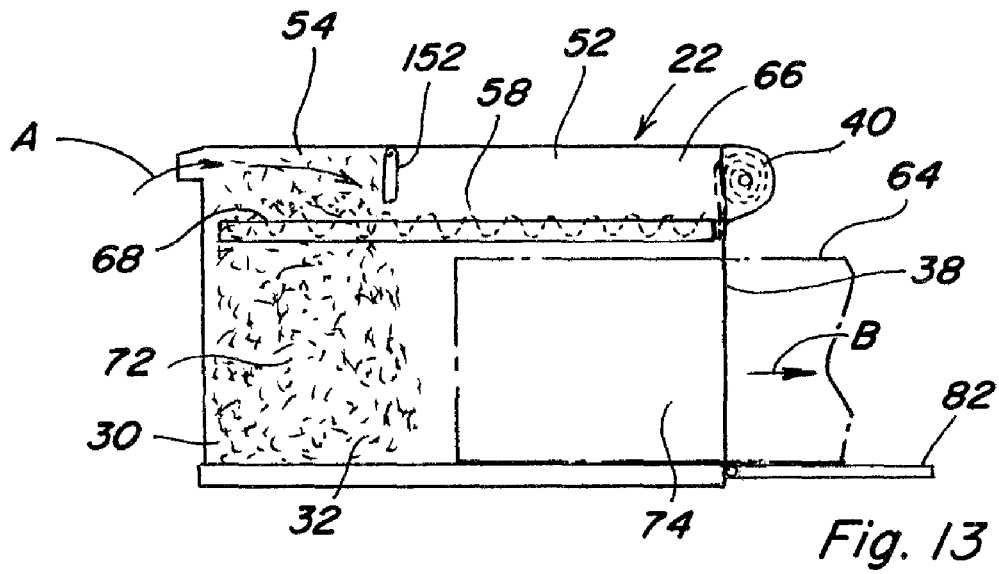
FIG. 13 is another simplified schematic side view of the module builder, showing movement of a cotton module from a module building chamber, while cotton is conveyed and distributed into a portion of the chamber vacated by the module.

In FIG. 13, as harvesting continues, cotton continues to flow into forward end portion 54, as denoted by arrow A, continues. Here, module 64 is illustrated in a position partially through opening 38 onto transporter 82, to vacate forward portion 72 of module building chamber 30. This can be a part of the automatic transfer or another routine. Cotton is largely prevented from entering rear end portion 66 of chamber 52, by the presence of panel 152 in its deployed position, and module 64 acts as a wall and barrier to passage of loose cotton through opening 38. As module 64 vacates more of chamber 30, the cotton will fill into the newly vacated space. Also as module 64 passes through rear opening 38, the top surface of the module can optionally be brushed or otherwise removed by a device provided for that purpose, to remove loose cotton, which will fall onto the floor of the chamber.

Figure 14:
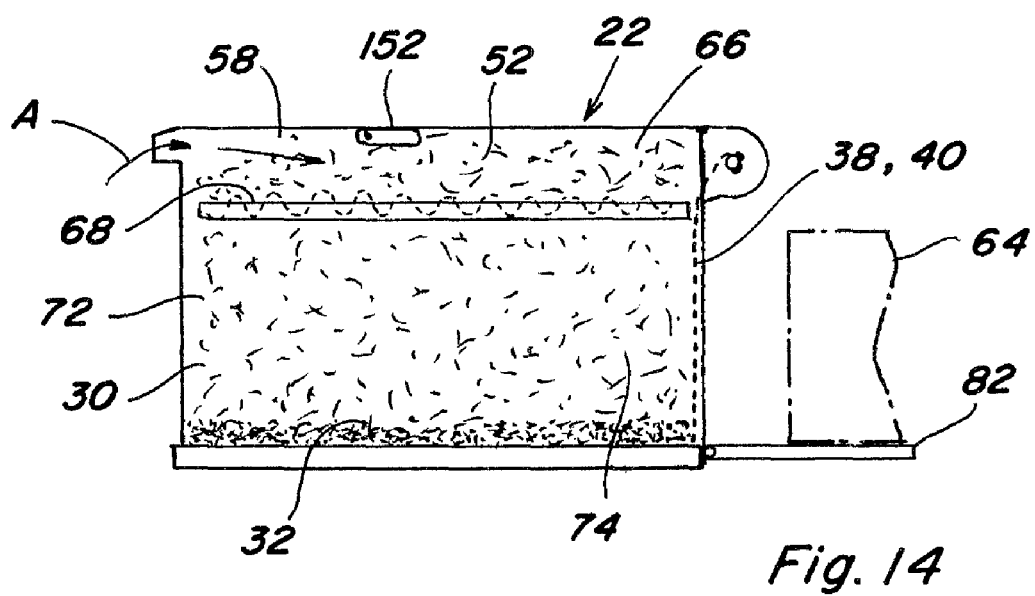
FIG. 14 is still another simplified schematic side view of the module builder, showing the module out of the module building chamber.

In FIG. 14, harvesting continues, and module 64 is now completely located on transporter 82. As soon as the module is off of floor 32, cotton drivers 104 on floor 32 (FIG. 1) can be stopped, and even reversed so as to not carry loose cotton through opening 38 onto the transporter. Door 40 is also rapidly closed to cover opening 38. Panel 152 is now moved to its stored position, to allow incoming cotton (arrow A) to reach rear end portion 66 of chamber 52. These steps can be performed automatically by controller 78 as part of the transfer routine, or a part of another module building routine. Augers 68 can be operated as desired or required to convey and distribute cotton in chamber 30, including more in a rearward direction, to even out cotton distribution in forward and rear portions 72 and 74. Again, these steps can be performed automatically as part of either routine. As the cotton accumulates in chamber 30, compacting apparatus will be periodically lowered to compact the cotton to form a new module.

At a desired time, transporter 82 can be pivoted in the above described manner to the tilted unloading position, including by pivoting or retracting the wheel assemblies 112 or 126 to their respective unload modes (FIGS. 5 and 7), as also described above. Cotton drivers 106 (if present) on transporter 82 can be operated, or just gravity relied on, to unload the module onto the ground or another surface, as illustrated in FIG. 5. This can be done automatically, by controller 78 of system 76, as part of an unloading routine. Then, when the module has been unloaded, the transporter is returned to the generally horizontal transport position, or folded to the folded position, as desired, also automatically. Again, all of these steps can be completed on-the-go, while harvesting.

As an advantage of the invention, a module can be removed from the module building chamber, at any time, without interruption of the harvesting operation. Thus, if a module is completed midfield, away from a desired unloading location, such as the edge of a field or the like, the completed module can be moved to the transporter, without interrupting harvesting, and with only minimally accumulating cotton in the accumulating cavity as the module is moved out of the module building chamber. The module on the transporter can then be unloaded at any convenient time, such as when the machine reaches the edge of a field or other suitable location for unloading, and, if the second module is also complete at this time, it can also be unloaded, by movement from the module builder to the transporter and then unloading from the transporter. An advantage here is that the second module can be unloaded into close proximity or abutment with the first module, by positioning the rear end of transporter 82 next to the end of the first module and unloading the second module, to facilitate sequentially picking up the modules by a conventional module transporter.

Figure 15:
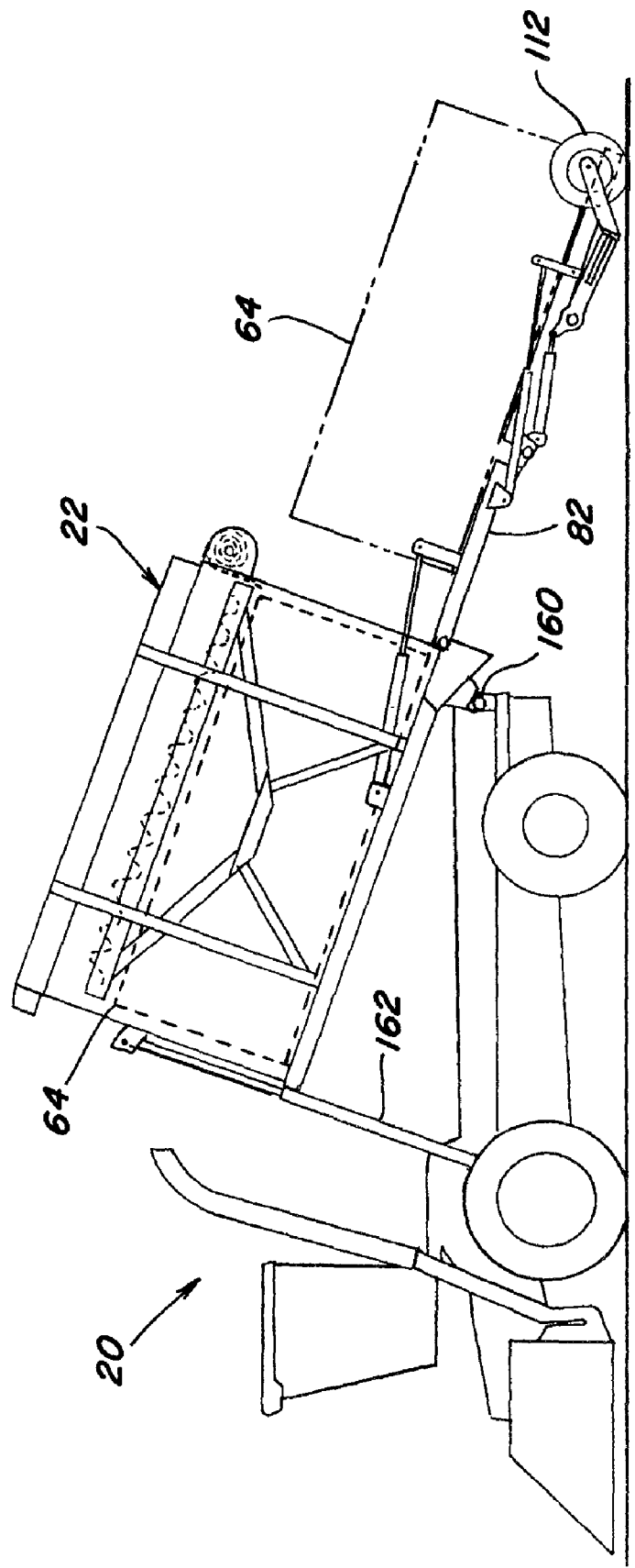
FIG. 15 is another simplified side view of the harvesting machine, showing the module builder and associated transporter optionally tilted, and illustrating a cotton module in phantom lines on the transporter.

Referring also to FIG. 15, it is further noted that harvesting machine 20 can optionally be equipped for alternatively tilting module builder 22 for unloading, in the well known manner, instead of tilting just transporter 82 relative to the module builder as explained above. Here, the rear end of module builder 22 is connected to the frame of machine 20 by pivot joints 160, and the front end of the module builder is connected to the frame with a tilt driver 162, which is preferably a fluid cylinder. Tilt driver 162 can be operatively controlled by controller 78 of control system 76, for tilting module builder 22 in coordination with operation of the drivers of whatever wheel assembly is used, e.g. wheel assembly 112 shown, or wheel assembly 126, to the position shown. That is, as the module builder is tilted from the harvesting position, the module builder will be tilted also, to provide a level, continuous path from the module builder to the ground or other surface onto which a module is to be unloaded. Additionally, a first module 64 may be located on transporter 82, and a second in the module builder, and they can be sequentially unloaded in abutting relation, if desired.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A combination of an on-board rectangular cotton module builder and module transporter for a self-propelled cotton harvesting machine, comprising:

a cotton module builder including a generally horizontal, flat floor and a wall structure extending upwardly from peripheral portions of the floor, and a door enclosing a rear opening, defining a rectangular module building chamber, a roof structure disposed over the module building chamber, the roof structure having at least one forward inlet opening through which harvested cotton is received from the harvesting machine, and an accumulating cavity into which the cotton is received, and cotton compacting apparatus disposed in an upper region of the module building chamber and having a first mode which is a non-operating state, a second mode wherein the apparatus is operable for conveying and distributing the cotton from the accumulating cavity into the module building chamber, and a third mode for movement downwardly into the chamber against the cotton distributed therein for compacting the cotton into a cohesive rectangular cotton module, the door being openable to allow passage of the cotton module through the rear opening;

a module transporter mounted on the harvesting machine rearwardly of and adjacent to the rear opening, the transporter being configured so as to be foldably compactable in a stored position adjacent to the door of the module builder, and unfoldable into a generally horizontal deployed position extending rearwardly and outwardly from the rear opening in substantially coplanar relation to the floor, the transporter being adapted for receiving and supporting a cotton module from the module builder, the transporter being configured to be pivotable from the generally horizontal deployed position to a tilted position extending downwardly from the module builder to a surface disposed therebelow, and a wheel assembly mounted on the transporter and configurable in a transport mode for supporting the transporter in the horizontal deployed position with a cotton module thereon for travel over a field as the machine harvests cotton therefrom, and in an unload mode supporting the transporter in the tilted position with a cotton module thereon for travel over a field as the machine harvests cotton; and at least one driver operable for moving a cotton module from the floor of the module builder through the rear opening and onto the transporter.

2. The combination of claim 1, wherein the harvesting machine includes apparatus for generating at least one rearwardly directed air flow carrying the harvested cotton into the accumulating cavity through the at least one inlet opening, and wherein the module builder further comprises a panel disposed in the accumulating cavity intermediate the at least one inlet opening and a rear end portion of the accumulating cavity above the rear opening, and apparatus supporting the panel and operable for moving the panel between a stored position for allowing substantially free movement of the cotton toward the rear end portion of the accumulating cavity, and a deployed position extending between the cotton compacting apparatus and a roof enclosing an upper periphery of the accumulating cavity, for containing the cotton which enters the accumulating cavity within a forwardly located portion thereof adjacent to the at least one inlet opening and preventing the cotton which enters the accumulating cavity from reaching the rear end portion thereof.

3. The combination of claim 2, wherein the panel has holes therethrough for allowing air to pass therethrough.

4. The combination of claim 2, further comprising apparatus operable for automatically moving the panel to the deployed position when the door is opened, and for automatically moving the panel to the stored position when the door is closed.

5. The combination of claim 1, wherein the door comprises a roll up door.

6. The combination of claim 1, wherein wheel assembly comprises wheels connected to telescoping members supporting the transporter, the members being telescopically extendable to an extended configuration when the wheel assembly is in the transport mode for supporting the transporter in the deployed position, and the members being telescopically retractable to a retracted configuration shorter than the extended configuration when the wheel assembly is in the unload mode for supporting the transporter in the tilted position.

7. The combination of claim 1, wherein the module builder is supported so as to be tiltable to a tilted position with the transporter in the deployed position, so as to orient the floor and the transporter at an acute angle relative to horizontal, for enabling unloading a module directly from the module builder onto a surface located therebelow.

8. A self-propelled cotton harvesting machine, comprising:
a plurality of harvesting units configured and operable for harvesting cotton from cotton plants as the machine moves in a forward direction over a field;
a cotton module builder including a generally horizontal, flat floor, a wall structure extending upwardly from front and side peripheral portions of the floor, and a rear door enclosing a rear opening, defining a rectangular module building chamber, a roof structure disposed over the module building chamber, the roof structure having at least one forwardly located inlet opening through which at least one airborne stream of harvested cotton is received from the harvesting units, and an accumulating cavity into which the cotton is received, and cotton compacting apparatus disposed in an upper region of the module building chamber below the accumulating cavity and operable in a raised mode for supporting the cotton received into the accumulating cavity, in a distributing mode for conveying and distributing the cotton from the accumulating cavity into the module building chamber, and in a compacting mode for movement downwardly into the chamber against the cotton distributed therein for compacting the cotton into a cohesive rectangular cotton module, the door being openable for unloading the cotton module through the opening; and
a panel disposed in the accumulating cavity intermediate the at least one inlet opening and a rear end portion of the accumulating cavity above the rear opening, and apparatus supporting the panel and operable for moving the panel between a stored position for allowing substantially free movement of the cotton toward the rear end portion of the accumulating cavity, and a deployed position extending between the cotton compacting apparatus and a roof enclosing an upper periphery of the accumulating cavity, for containing the cotton which enters the accumulating cavity within a forwardly located portion thereof adjacent to the at least one inlet opening and preventing the cotton which enters the accumulating cavity from reaching the rear end portion thereof.

9. The harvesting machine of claim 8, further comprising a controller connected in operative control of the apparatus and operable for moving the panel, the controller being automatically operable for positioning the panel in the deployed position when the door is open, and in the stored position when the door is closed, and the controller being connected in operative control of the cotton compacting apparatus and automatically operable for controlling the compacting apparatus for distributing the cotton into a forward portion of the module building chamber when the panel is in the deployed position.

10. The harvesting machine of claim 8, further comprising:
a module transporter mounted on the harvesting machine adjacent to the rear opening, the transporter being configured so as to be foldably compactable in a stored position adjacent to the rear door of the module builder, and so as to be unfoldable into a generally horizontal deployed position extending outwardly from the rear opening in substantially coplanar relation to the floor, the transporter being adapted for receiving and supporting a cotton module, the transporter being configured to be pivotable from the generally horizontal deployed position to a tilted position extending downwardly from the module builder to a surface disposed therebelow, and a wheel assembly mounted on the transporter and configurable in a transport mode for supporting the transporter in the horizontal deployed position with a cotton module thereon for travel over a field as the machine harvests cotton therefrom, and in an unload mode supporting the transporter in the tilted position with a cotton module thereon for travel over a field as the machine harvests cotton; and
at least one driver operable for moving a cotton module from the floor of the module builder onto the transporter.

11. The harvesting machine of claim 10, wherein wheel assembly comprises wheels connected to telescoping members supporting the transporter, the members being telescopically extendable to an extended configuration when the wheel assembly is in the transport mode for supporting the transporter in the deployed position, and the members being telescopically retractable to a retracted configuration shorter than the extended configuration when the wheel assembly is in the unload mode for supporting the transporter in the tilted position.

12. The harvesting machine of claim 10, wherein the module builder is supported so as to be tiltable to a tilted position with the transporter in the deployed position, so as to orient the floor and the transporter at an acute angle relative to horizontal, for enabling unloading a module directly from the module builder onto a surface located therebelow.

13. The harvesting machine of claim 8, wherein the panel has holes therethrough for allowing air to pass therethrough.

14. The harvesting machine of claim 8, wherein the door comprises a roll up door.

15. A self-propelled cotton harvesting machine having an on-board rectangular cotton module building and transporting system, comprising:
a cotton module builder disposed on the machine and including a generally horizontal, flat floor and a wall structure extending upwardly from peripheral portions of the floor, and a door enclosing a rear opening, defining a rectangular module building chamber, a roof structure disposed over the module building chamber, the roof structure having at least one forward inlet opening through which harvested cotton is received from the harvesting machine, and an accumulating cavity into which the cotton is received, and cotton compacting and distributing apparatus disposed in an upper region of the module building chamber, the apparatus having at least one conveyor operable for conveying and distributing the cotton received into the accumulating cavity into the module building chamber, and the apparatus being movable downwardly into the module building chamber for compacting the cotton distributed therein into a cohesive rectangular cotton module, the door being openable to allow passage of the cotton module through the rear opening, and a panel disposed in the accumulating cavity intermediate a forward portion thereof in connection with the at least one inlet opening and a rear portion of the accumulating cavity above the rear opening, and an actuator operable for moving the panel between a stored position for allowing substantially free movement of the cotton toward the rear portion, and a deployed position for containing the cotton in the forward portion; and
a controller connected in operative control of the cotton compacting and distributing apparatus and the actuator and automatically operable when the door is open, for moving the panel to the deployed position and controlling the distributing apparatus for distributing the cotton toward a forward region of the module building chamber.

16. The harvesting machine of claim 15, further comprising a module transporter disposed on the harvesting machine rearwardly of the module builder, the transporter being configured so as to be foldably compactable in a stored position adjacent to the door of the module builder, and unfoldable into a generally horizontal deployed position extending rearwardly and outwardly from the rear opening in substantially coplanar relation to the floor, the transporter being adapted for receiving and supporting a cotton module from the module builder thereon, the transporter being configured to be pivotable from the generally horizontal deployed position to a tilted position extending downwardly from the module builder to a surface disposed therebelow, and a wheel assembly mounted on the transporter and configurable in a transport mode for supporting the transporter in the horizontal deployed position with a cotton module thereon for travel over a field as the machine harvests cotton therefrom, and in an unload mode supporting the transporter in the tilted position with a cotton module thereon for travel over a field as the machine harvests cotton; and
at least one driver operable for moving a cotton module from the floor of the module builder through the rear opening and onto the transporter.

17. The harvesting machine of claim 16, wherein wheel assembly comprises wheels connected to telescoping members supporting the transporter, the members being telescopically extendable to an extended configuration when the wheel assembly is in the transport mode for supporting the transporter in the deployed position, and the members being telescopically retractable to a retracted configuration shorter than the extended configuration when the wheel assembly is in the unload mode for supporting the transporter in the tilted position.

18. The harvesting machine of claim 16, wherein the module builder is supported so as to be tiltable to a tilted position with the transporter in the deployed position, so as to orient the floor and the transporter at an acute angle relative to horizontal, for enabling unloading a module directly from the module builder onto a surface located therebelow.

19. The harvesting machine of claim 15, wherein the panel has holes therethrough for allowing air to pass therethrough.

20. The harvesting machine of claim 15, wherein the door comprises a roll up door.

21. A method of operation of a self-propelled cotton harvesting machine, comprising steps of:
providing a cotton module builder disposed on the machine and defining a module building chamber including a door closing an opening, and a roof structure disposed over the module building chamber, the roof structure having at least one inlet through which harvested cotton is received from the harvesting machine, and an accumulating cavity into which the cotton is received;
providing cotton compacting and distributing apparatus disposed in an upper region of the module building chamber, the apparatus having at least one conveyor operable for conveying and distributing the cotton received into the accumulating cavity into the module building chamber, and the apparatus being movable downwardly into the module building chamber for compacting the cotton distributed therein into a cohesive cotton module;

providing a module transporter disposed on the harvesting machine outwardly of the opening in position for receiving and supporting a cotton module moved through the opening from the module building chamber; and opening the door and moving the cotton module from the module building chamber through the opening and onto the transporter, while operating the compacting and distributing apparatus for conveying and distributing cotton from the accumulating cavity into a portion of the module building chamber as the module is moved therefrom.

22. The method of claim 21, comprising a step of providing a panel disposed in the accumulating cavity in a position for containing the cotton in a portion thereof above the portion of the module building chamber from which the module is moved.

23. The method of claim 21, wherein the at least one inlet is located at an end of the accumulating cavity opposite an end of the module building chamber including the opening, such that the portion of the module building chamber into which the cotton is conveyed and distributed is spaced from the opening.

\* \* \* \* \*